Dec. 24, 1935.　　　　　C. C. MINTER　　　　　2,025,121
APPARATUS FOR TESTING COMBUSTION
Original Filed June 19, 1931
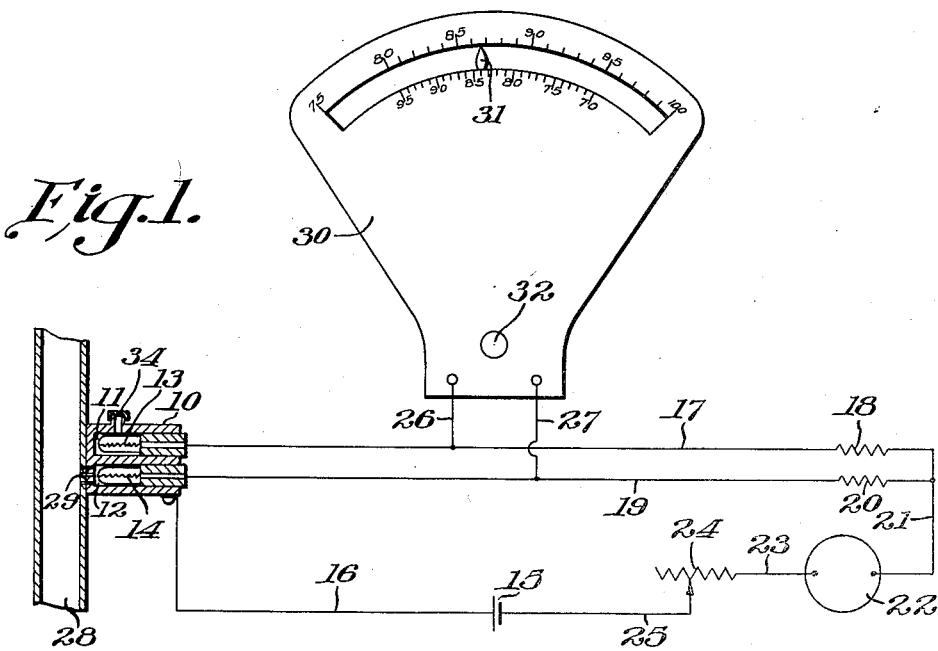
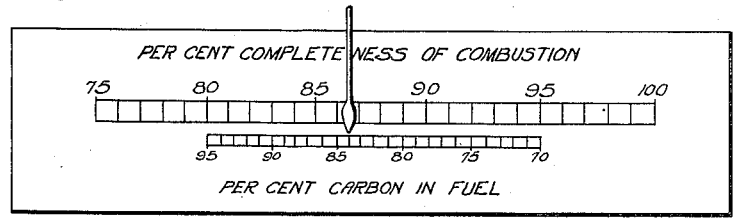
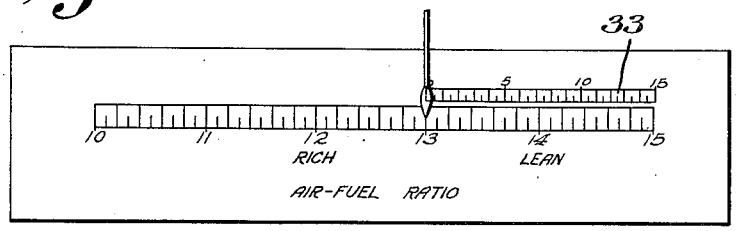
INVENTOR
Clarke C. Minter.
BY R. J. Dearborn
HIS ATTORNEY Patented Dec. 24, 1935

2,025,121

UNITED STATES PATENT OFFICE 2,025,121

APPARATUS FOR TESTING COMBUSTION

Clarke C. Minter, Fishkill, N. Y.

Original application June 19, 1931, Serial No. 545,388. Divided and this application December 30, 1932, Serial No. 649,457

2 Claims. (Cl. 73—51)

This invention, a division of my copending application, Serial No. 545,388, filed June 19, 1931, relates to improvements in Apparatus for testing combustion.

Its object is to provide a simple and efficient apparatus for measuring the degree of completeness of combustion by means of an examination of the products of combustion.

In order to attain this result I use elements of a Wheatstone bridge in thermal conductivity cells, and also utilize my discovery of the fact that a linear relation exists between the air-fuel ratio of a fuel mixture and the thermal conductivity of the resulting exhaust gases. Further I provide a meter which will show directly the percentage of completeness of combustion or the ratio of air to fuel in the combustible mixture and which may have calibrations by means of which the neutral point of the instrument may be set to correspond with the percentage of carbon in the fuel to be tested. One of the purposes of the invention is to facilitate the testing of internal combustion engines, although it is not limited to such use.

Other objects will appear from the following specification in which I will describe the invention, the specific features of which will be pointed out in appended claims.

Referring to the drawing—

Fig. 1 is a diagram of an arrangement for practicing this invention;

Fig. 2 is a diagram of the instrument scale showing one form of calibration therefor; and Fig. 3 is a diagram of a differently calibrated instrument scale.

10 is a block of metal of high thermal conductivity, such as copper, in which is formed a comparison cell 11 and an analyzing cell 12. 13 and 14 are resistance spirals in cells 11 and 12 respectively. One end of each of these spirals is connected with a terminal of a battery 15 by a conductor 16 which connects the battery with the block 10. The other end of spiral 13 is connected by a conductor 17 with a resistance 18. The similar end of spiral 14 is connected by a conductor 19 with a resistance 20. The outer ends of resistances 18 and 20 are connected by a conductor 21, through a milli-ammeter 22, conductor 23, adjustable rheostat 24 and conductor 25 back to the battery 15. A meter 30 is connected across the conductors 17 and 19 by wires 26 and 27. The resistance of the spiral 13 and resistance 20 equals that of spiral 14 and resistance 18 so that if the gases in cells 11 and 12 are the same, or of equal thermal conductivity, the battery current passing through them will not affect the meter 30. In other words, the resistance of spiral 13 will equal the resistance of spiral 14 when the thermal conductivity of the gas in cell 12 equals the thermal conductivity of the gas in cell 11. The arrangement thus far described is well known and so needs no further description.

28 is a conduit for exhaust gases which communicates with the analyzing cell 12 by minute orifices 29 which permit the cell 12 to become filled with the exhaust gas. The hydrogen resulting from combustion increases the thermal conductivity of this gas in cell 12 and the carbon dioxide decreases it. This tends to disturb the equilibrium of the Wheatstone bridge arrangement so that when a current is passed through it there will be a difference of potential between the wires 26 and 27. As the percentage of air in the combustible mixture is increased the percentage of carbon dioxide in the combustion products increases and the percentage of hydrogen diminishes unless, of course, the air is admitted in such great excess as to dilute the carbon dioxide. The variation in the concentration of these two gases in the combustion products takes place in such a manner that the net thermal conductivity of the combustion products diminishes linearly as the percentage of air in the combustible mixture is increased. If the cell 11 is filled with air or a gas having the same thermal conductivity as air, the composition of the gas in cell 12 will form a basis for actuating a meter by setting up a difference of potential between the wires 26 and 27 when a current is passed through the arrangement shown in Fig. 1.

According to my invention I have provided a meter 30 which is arranged, when actuated by the difference of potential between the wires 26 and 27, to give the desired indications directly. This is done by selecting a meter which has the general characteristics of a milli-voltmeter, the pointer of which will be deflected to the left, if the conductivity of the gas in cell 12 is greater than that of the air in cell 11. That is, a preponderance of hydrogen in the gas will cause the meter needle to be deflected to the left. If there is a preponderance of carbon dioxide in cell 12 the meter needle will be deflected to the right. Thus, it is desirable to set the meter needle 31 at a neutral point intermediate the ends of the meter scale. It can be shown that the maximum percentage of carbon dioxide in the products of combustion is directly proportional to the percentage of carbon in the fuel, and I have found that the greater the percentage of the carbon dioxide the greater will be the difference between the thermal conductivity of the gas at complete combustion and at the neutral point. I have also found it to be necessary to make this setting proportional to the percentage of carbon content of the fuel. For example, in Fig. 1 the needle 31 is shown as set at approximately 84.3 on the lower scale which is the point at which it is set when the arrangement is to be used for testing the completeness of combustion of a fuel containing 84.3 percent carbon. This may be done in the usual manner by means of an adjusting button 32. Since the construction of the adjusting button does not form a part of my invention the details thereof have not been illustrated. An adjusting device of any suitable type may be used such as shown, for instance, in Patent No. 800,873 to E. F. Northrup. The position of needle 31 thus set by the lower scale has a position relative to the upper scale which is that which it would assume when current is passed through the Wheatstone bridge arrangement, when the gas in cell 12 has the proportions of hydrogen and carbon dioxide which give it the same thermal conductivity as that of the air in cell 11. The relation between the two scales of Fig. 2 was determined experimentally. Fuels of known carbon content were mixed with air in such proportion that the thermal conductivity of the combustion products of each fuel-air mixture was the same as that of air. The products of combustion were then analyzed chemically and the percentage completeness of combustion calculated from the analyses. Thus the point on the upper scale directly over the lower scale point marked 84.3 (which indicates that the fuel being tested contains 84.3% carbon) is marked 86.6 since this is the percentage completeness of combustion to which it would be necessary to burn that fuel in order that the thermal conductivity of the products of combustion would be the same as the thermal conductivity of the air (or gas having the same thermal conductivity as air) in cell 11. The percentage of air in the combustible mixture necessary to give products of combustion having the same thermal conductivity as air will naturally have to be varied in accordance with the carbon content of the fuel being used. Since the air-fuel ratio at complete combustion decreases as the carbon content of the fuel is increased (air-fuel ratio = 34.47 − 0.23 × % carbon in the fuel) it is clear that as the air-fuel ratio at complete combustion decreases, the percentage of air in a complete combustion mixture also decreases. For instance, for a gasoline-air mixture at the point of complete combustion, 1¾ of the total is air while for a benzene-air mixture at the point of complete combustion the ratio of air to the total is $$\frac{13.26}{14.26}.$$

It is clear that the first fraction is greater than the second fraction, thus showing that the percentage of air in a complete combustion mixture of gasoline and air is greater than the percentage of air in complete combustion of mixture of benzene and air.

The thermal conductivity of the products of combustion reaches a minimum at the point of complete combustion since the percentage of carbon dioxide present is greatest at that point. The characteristics of the meter 30 and of the resistance elements of the Wheatstone bridge are selected to be such as to cause the needle 31 of the meter to move to the extreme right end of the upper scale with a given current flowing through the resistance elements, when the gases in cell 12 are those resulting from complete combustion of the particular fuel to be tested. This proper amount of current may be provided by an adjustment of rheostat 24, the amount of current being indicated by means of the milli-ammeter 22. This point, in Fig. 1, is marked to designate one hundred percent or complete combustion. (Any other percentage, such as ninety-five, may be selected as the extreme point of indication, if desired, by filling cell 12 with a gas having a thermal conductivity equal to that of the products of combustion of the fuel to be tested, which has been partially burned to the desired completeness of combustion selected for calibration).

Now with the neutral point previously defined, and the point of maximum degree of completeness of combustion determined, the scale is marked with equally spaced graduations, which may be done because of the experimentally discovered linear relation found to exist between the degree of completeness of combustion and the thermal conductivity of the resultant gases.

If, then, when current is passed through the Wheatstone bridge arrangement, the gas in cell 12 is that resulting from a degree of combustion of less than that indicated by the pointer 31 at the start, the needle will be deflected to the left and will come to rest opposite a graduation which shows the percent of completeness of the combustion which produced the gas in cell 12.

When there is a sufficient amount of carbon dioxide in the gas in cell 12 to make its thermal conductivity less than that of air, the needle 31 will be deflected to the right and will come to rest opposite a point on the upper scale which will show the percent of completeness of the combustion which produced the gas in cell 12.

The upper scale will correctly indicate the completeness of combustion of fuels having different percentages of carbon content within such a range as that shown on the lower scale in Fig. 1. Therefore, by the simple expedient of setting the neutral position of the meter needle to correspond with the known percentage of carbon content of the fuel to be tested and regulating the current through the bridge, the instrument may be used without alteration for testing a wide range of fuels.

Other factors than the completeness of combustion may be used as a basis for calibrating the scale. In Fig. 3 I have shown a scale calibrated in terms of air-fuel ratio. In this case the neutral point for the meter needle is set to correspond with a thirteen to one ratio which is that of air and ordinary aromatic free gasoline which, upon combustion, will produce a gas having the same thermal conductivity as that of air. It is assumed that the carbon content of average gasolines is substantially uniform. If a fuel other than aromatic free gasoline is used, the air-fuel ratio at the neutral point will have to be varied in accordance with the carbon content of such a fuel since, if the air-fuel ratio at the point of complete combustion decreases as the carbon content of the fuel is increased, the air-fuel ratio giving products of combustion having the same thermal conductivity as air (neutral point), will naturally decrease as the carbon content of the fuel is increased. Obviously a richer mixture will result in a preponderance of hydrogen and a needle deflection to the left. Conversely, an increase of air will result in a greater percentage of carbon dioxide and a lower thermal conductivity which, as has been shown, will cause a needle deflection to the right. As complete combustion of ordinary gasoline occurs with an air-fuel ratio of fifteen to one the extreme point of indication on the scale is marked fifteen. If a fuel other than aromatic free gasoline is used the end of the scale will have to be marked in accordance with the air-fuel ratio at complete combustion for the fuel being considered. When the fuel is one of known carbon content, the air-fuel ratio at complete combustion can be calculated by means of the relation $$R = 34.47 - 0.2298 \, pC$$

where R is the air-fuel ratio, $pC$ is the percentage of carbon in the fuel, and 34.47 and 0.2298 are respectively the intercept and slope of the curve representing air-fuel ratio at the point of complete combustion as a function of the percentage of carbon in the fuel. The end of the scale is then marked with a number corresponding to that calculated by the above equation; for example,

|  | End of scale |
|---|---|
| Aromatic free gasoline | 15.00 |
| Pure benzine $C_6H_6$ | 13.26 |

No leaner mixture can be measured with this scale as a further increase of the proportion in the combustible mixture will raise the thermal conductivity of the products of combustion and the needle, after reaching the point marked fifteen, will start to return toward its neutral point. After the mixture is made leaner the percentage of carbon dioxide goes through a maximum, and the thermal conductivity of the products of combustion through a minimum. The reason that the air-fuel ratio scale will not indicate beyond 15 is that a further increase of air results in an increase in thermal conductivity and the meter needle reverses direction and returns toward the neutral point of the scale. Increasing the percentage of air beyond the point of complete combustion merely dilutes the combustion products with air, thereby reducing the percentage of carbon dioxide in the combustion products. Since air has a greater thermal conductivity than carbon dioxide, the thermal conductivity of the combustion products will increase as the percentage of carbon dioxide decreases.

In the use of the term "ordinary aromatic free gasoline" herein, I have reference to gasolines having substantially the carbon content of straight run gasoline from paraffin base crude as distinguished from benzol blends which have a substantially higher carbon content. The term will therefore include the ordinary commercial gasolines since their carbon contents are known to be about the same as gasoline from paraffin base crude.

In Fig. 3, an auxiliary scale 33 is shown with its zero point directly over the numeral thirteen of the lower scale, and running to the right to a point slightly beyond fifteen of the lower scale. As shown in Fig. 3, this scale can be used to indicate the percentage of carbon dioxide in the gas in cell 12, and can be used in determining the air-fuel ratio when air is in excess and when there is no hydrogen present by converting the scale to read in air-fuel ratio for an aromatic free gasoline by the following relation:

$$R = \frac{202}{pCO_2} + 1.13$$

where R is the air-fuel ratio and $pCO_2$ is the percentage of carbon dioxide. It is well known from experiment that beyond the point of complete combustion, that is, when air is in excess, the products of combustion contain no more combustible material such as carbon monoxide and hydrogen. If the percentage of air in the combustible mixture is increased in small steps and the meter needle allowed to come to rest between each increase in air, it will be observed that the meter needle goes to the extreme right hand end of the scale and then starts back toward the neutral point. When the needle starts back toward the neutral point after having reached the end of the lower scale, it is then indicating on the upper scale. If the indicator should read, for instance, 14 on the lower scale, an operator would know that the lower scale should be read since it would be practically impossible to operate a gasoline engine on a combustible mixture so lean that only 7.3% of carbon dioxide could be found in the exhaust. To determine which scale to use when the meter needle indicates between 14.5 and 15 on the lower scale, it is necessary simply to increase the percentage of air by a very small amount and observe the movement of the needle. If a slight increase in the percentage of air in the combustible mixture causes the meter needle to move toward the end of the scale, the lower scale is the correct one to use, since fuel is still in excess. If on the other hand a slight increase in air in the combustible mixture causes the meter needle to move toward the neutral point of the instrument, the upper scale is the correct one to use.

The neutral point of the meter needle may conceivably be at one end of the scale if the thermal conductivity of the products of combustion in cell 12 is compared with some gas other than air in cell 11. To that end I provide the cell 11 with an orifice through which a desired gas or mixture of gases may be introduced. This orifice is closed by a cap 34. A gas or a mixture of gases having a thermal conductivity equal to that of the products of combustion of the fuel tested at complete combustion thereof is put in cell 11. The neutral point of the needle will then be at the point marked 100 on the scale and it may be set there by means of the button 32. Then, upon passing current through the Wheatstone bridge arrangement, the needle will be deflected to the left to a point which will indicate the percent of complete combustion of the exhaust gases.

In operating the instrument having the scale as shown in Fig. 3 the meter needle 31 is first moved by means of the button 32 to the point marked 13 on the scale. By means of the variable resistance 24 the proper amount of current as shown by the ammeter 22 is adjusted, the amount of current depending on the characteristics of the instrument. The exhaust or the combustion gases are then passed into or through the cell 12 and the meter needle 31 will come to rest at a point opposite the scale which will indicate the air-fuel ratio in the combustible mixture with a high degree of accuracy.

Other modifications of the apparatus herein described for illustrative purposes may be made within the spirit and scope of this invention and I intend no limitations other than those imposed by the appended claims.

I claim:

1. In combination with a Wheatstone bridge having two of its resistance elements in comparison cells arranged to vary the electrical potential across said bridge in accordance with differences in the thermal conductivity between that of the products of combustion and that of another gas, a meter connected across said bridge and having a scale subdivided to indicate directly percentages of completeness of combustion of the fuel of which the products of combustion are in one of said cells, a co-related scale indicating the percentage of carbon in fuels to be tested, and means for setting the needle of said meter at a point intermediate the ends of said scales, said point being indicated on said co-related scale as the amount of carbon in the fuel to be tested.

2. In combination with a Wheatstone bridge having two of its resistance elements in comparison cells arranged to vary the electrical potential across said bridge in accordance with differences in the thermal conductivity between that of the products of combustion of an air-fuel mixture and of another gas, an electrical measuring instrument connected across said bridge and having a scale subdivided to indicate directly percentages of completeness of combustion of the fuel of which the products of combustion are in one of said cells, a co-related scale indicating the percentage of carbon in fuels to be tested and means for setting the needle of said measuring instrument at a point intermediate the ends of said scales when said Wheatstone bridge is in its balanced condition with the thermal conductivity of the products of combustion equal to the thermal conductivity of said other gas, said point being indicated on said co-related scale as the amount of carbon in the fuel to be tested and corresponding on said first mentioned scale to the percentage completeness of combustion of a fuel having the carbon content indicated on said co-related scale.

CLARKE C. MINTER.